J. D. JONES.
THRESHING CYLINDER.
APPLICATION FILED FEB. 18, 1913. RENEWED APR. 2, 1914.
1,215,940.
Patented Feb. 13, 1917.
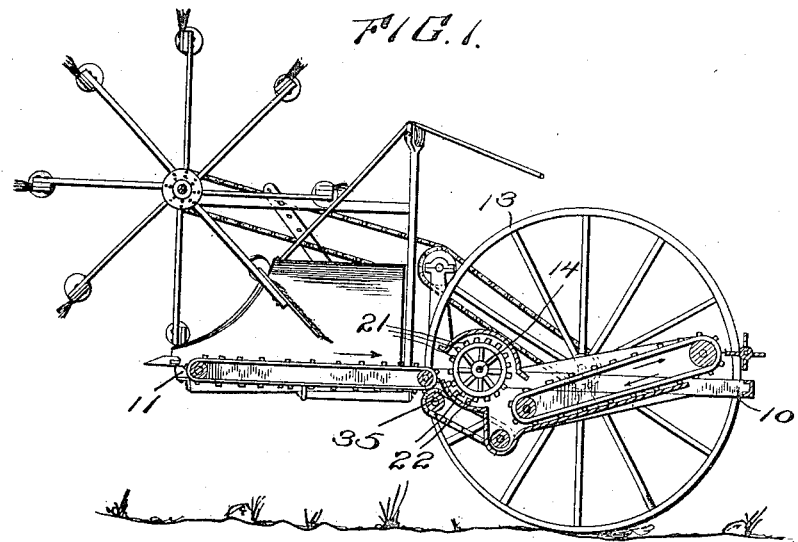
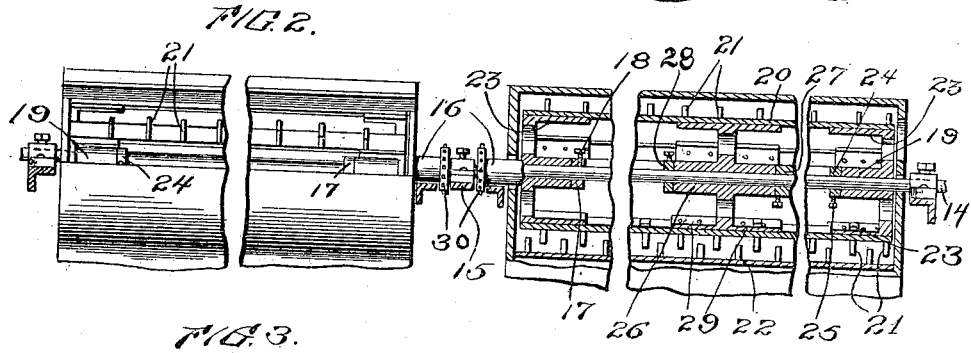
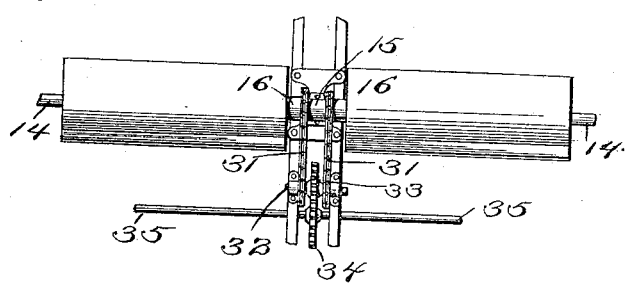
Witnesses
R. S. Trogner
L. L. Morrill
Inventor
John D. Jones,
By Mason Fenwick & Lawrence,
Attorneys

UNITED STATES PATENT OFFICE.

JOHN D. JONES, OF WALLA WALLA, WASHINGTON.

THRESHING-CYLINDER.

1,215,940.  Specification of Letters Patent.  Patented Feb. 13, 1917.

Original application filed January 24, 1913, Serial No. 744,021. Divided and this application filed February 18, 1913, Serial No. 749,097. Renewed April 2, 1914. Serial No. 829,135.

*To all whom it may concern:*

Be it known that I, JOHN D. JONES, a citizen of the United States, residing at Walla Walla, in the county of Walla Walla and State of Washington, have invented certain new and useful Improvements in Threshing-Cylinders; and I do hereby declare the following to be a full, clear, and exact description of the invention, such as will enable others skilled in the art to which it appertains to make and use the same.

This invention relates to cylinders for threshing machines and has for an object to provide a cylinder especially adapted for use in combination with a harvesting and threshing machine such as disclosed in application Serial No. 744,021, filed Jan. 24th, 1913, of which this application is a division, but adapted also for use in other relations.

A further object of the invention is to provide a cylinder mounted to rotate upon a fixed shaft with improved means for preventing longitudinal movement of the cylinder upon the shaft.

A further object of the invention is to provide improved means for applying power to the improved cylinder.

A further object of the invention is to construct a cylinder in sections having intermediate supports and with improved means for driving the sections.

With these and other objects in view the invention comprises certain novel constructions, combinations and arrangement of parts as will be hereinafter more fully described and claimed.

In the drawings:

Figure 1 is a view of the improved cylinder mounted upon a harvesting and threshing machine such as disclosed in said copending parent application.

Fig. 2 is a view of the cylinder half in elevation and the other half in longitudinal section.

Fig. 3 is a top plan view of the cylinder housing with the improved drive mechanism.

Like characters of reference designate corresponding parts throughout the several views.

The improved cylinder which forms the subject matter of this divisional application while adapted for use in conjunction with the harvesting and threshing machine disclosed in said copending application and comprising a frame 10 with an auxiliary frame 11 hinged thereto and all carried upon supporting wheels 13 is, of course, adapted for use in relation to other mechanisms than that shown. The cylinder will be described more or less particularly in association with such a machine but it is to be understood that such other structure is only described to disclose an operative structure and does not affect the present invention.

Upon the said frame 10 a shaft 14 is rigidly mounted having a central support at 15. Upon the shaft 14 adjacent the central support 15 hubs 16 are mounted to rotate with collars 17 rigidly secured upon the shaft 14 to prevent longitudinal movement of such hubs 16, the collars being secured upon the shaft in any approved and ordinary manner as by the use of the set screws 18.

A second hub 19 is spaced from the hub 16 and the two hubs connected together by the usual cylinder bars 20 carrying cylinder teeth 21 moving in conjunction with the concave 22. The cylinder heads carried by the hubs 16 and 19 are each provided with arms 23 extending toward each other and formed integral with the heads. The bars 20 may be secured to said arms 23 in the usual manner, as by providing the cylinder teeth with nuts on their inner ends and passing the teeth through said bars and arms.

The hub 19 is also held from movement by a collar 24 similar to the collar 17 held in like manner as by the set screw 25.

Intermediate the hubs 16 and 19 a central hub 26 is provided having collars 27 and 28 abutting the opposite ends of said central hub for assisting in holding the cylinder structure against longitudinal movement and resisting the end thrusts, especially when the machine is inclined to one side or the other in passing over uneven ground or when operating upon a hillside. The central hub is also provided with oppositely extending arms 29 to which the cylinder bars are secured in the same manner as to the arms 23.

Rigidly attached to or formed integral with the hubs 16 are sprockets 30 over which pass sprocket chains 31 driven from sprockets upon a shaft 32 which is in turn driven by a gear 33 intergeared with a gear 34 and driven from a shaft 35 journaled upon the frame 10. It will be apparent, therefore, that as the shaft 35 is driven the cylinder sections will be independently driven through the medium of their sprocket chains 31 and that the sections will be held against longitudinal movement by the collars abutting against the hubs whereby the cylinders are prevented from so engaging the concave as to crush and mutilate the grain. It will be understood, of course, that when the cylinder is mounted upon the harvesting and threshing machine as shown at Fig. 1 that it cannot be at all times properly leveled and that it will have a tendency to move longitudinally upon its shaft in either direction owing to the inclination of the machine and the shaft 14. Such tendency to move longitudinally in response to the inclination is, however, prevented by the abutting collars and the cylinder is held firmly in proper operative relation to the concave.

While in the drawing two cylinder sections are shown it is to be understood that any number may be employed all mounted upon a single shaft or upon separate individual stationary shafts as circumstances may make desirable.

By reason of the construction of the heads and the central hub with the integral laterally extending arms, to all of which the cylinder bars are readily connected at a plurality of points it will be understood that the cylinder is made exceedingly rigid to withstand the torsional stress of applying the power at one end of the structure.

It will also be apparent that by reason of the aforesaid construction of the cylinder the collars 17, 25, 27 and 28 may be adjusted to compensate for wear or any other reason for securing the adjustment as for instance to properly adjust the cylinder relative to the teeth of the concave.

I claim:

1. In a threshing machine, a shaft rigidly mounted, a threshing cylinder mounted to rotate upon the shaft and embodying spaced hubs, and collars abutting the hubs and located upon the shaft within the cylinder.

2. In a threshing machine, a fixed shaft, a threshing cylinder mounted upon the shaft and embodying spaced hubs, a sprocket formed upon one of the hubs exteriorly to the cylinder, and collars adjustably fixed to the shaft and abutting the hubs within the cylinder.

3. In a threshing machine, a fixed shaft, a threshing cylinder having a plurality of hubs spaced apart and mounted to rotate upon the shaft and collars adjustably fixed upon the shaft and abutting the several ends of the hubs.

4. In a threshing machine, a shaft fixedly supported at a plurality of spaced points, a plurality of independent cylinder sections mounted to rotate upon the shaft, and driving means connected independently with the sections adjacent one of the supporting points.

5. In a threshing machine, a shaft fixedly supported intermediate and adjacent its opposite ends, threshing cylinder sections mounted to rotate upon the shaft and upon opposite sides of the intermediate support, and driving means connected with the cylinder sections adjacent the intermediate support.

6. In a threshing machine, a shaft fixedly carried adjacent its opposite ends, an intermediate fixed support, cylinder sections journaled upon the shaft, means to hold the cylinder sections against longitudinal movement and in contiguity to the intermediate support, and means adjacent such intermediate support for driving the sections.

7. In a threshing machine, a shaft fixedly carried against rotation and longitudinal movement adjacent its opposite ends and at intermediate points by supports attached to the threshing machine frame, and cylinder sections having hubs journaled upon said shaft, said supports being exterior of the cylinder sections and located adjacent the outer ends of the hubs and acting as collars therefor.

8. In a threshing machine, a fixed shaft, a threshing cylinder mounted upon the shaft and having hubs at the ends and an intermediate hub spaced therefrom, collars within the cylinder abutting the opposite ends of the intermediate hub to thereby resist the end thrusts and maintain the cylinder in position on the shaft irrespective of any tilting movement of the machine.

In testimony whereof I affix my signature in presence of two witnesses.

JOHN D. JONES.

Witnesses:
John L. Fletcher,
L. L. Morrill.

Copies of this patent may be obtained for five cents each, by addressing the "Commissioner of Patents, Washington, D. C."